(12) United States Patent
Xu et al.

(10) Patent No.: US 11,851,721 B2
(45) Date of Patent: *Dec. 26, 2023

(54) DEVICE FOR CONTINUOUSLY PRODUCING SUGAR BY HYDROLYZATION USING LIGNOCELLULOSIC RAW MATERIAL

(71) Applicant: ECO Environmental Energy Research Institute Limited, Hong Kong (CN)

(72) Inventors: Bin Xu, Hong Kong (CN); Kam Shing Siu, Hong Kong (CN); Junde Lu, Hong Kong (CN); Connie Hiu Ying Chow, Hong Kong (CN)

(73) Assignee: ECO BIOMASS TECHNOLOGY COMPANY LIMITED, Hong Kong (CN)

( * ) Notice: Subject to any disclaimer, the term of this patent is extended or adjusted under 35 U.S.C. 154(b) by 567 days.

This patent is subject to a terminal disclaimer.

(21) Appl. No.: 16/894,353

(22) Filed: Jun. 5, 2020

(65) Prior Publication Data

US 2020/0377962 A1 Dec. 3, 2020

Related U.S. Application Data

(63) Continuation of application No. PCT/CN2018/117647, filed on Nov. 27, 2018.

(30) Foreign Application Priority Data

Dec. 6, 2017 (CN) .......................... 201721686929.X

(51) Int. Cl.
*B01J 19/20* (2006.01)
*B01J 4/00* (2006.01)
(Continued)

(52) U.S. Cl.
CPC .............. *C13K 13/00* (2013.01); *B01J 4/001* (2013.01); *B01J 19/0053* (2013.01); *B01J 19/20* (2013.01); *B01J 2219/00033* (2013.01)

(58) Field of Classification Search
CPC ... B01J 19/20; B01J 4/00; B01J 4/0001; B01J 2219/00033; B01J 2219/182
See application file for complete search history.

(56) References Cited

U.S. PATENT DOCUMENTS

| 4,427,453 A * | 1/1984 | Reitter ..................... C13K 1/02 127/1 |
| 2013/0071903 A1 | 3/2013 | Rowland et al. |
| 2017/0175209 A1 | 6/2017 | Thyr et al. |

FOREIGN PATENT DOCUMENTS

| CN | 101120102 A | 2/2008 |
| CN | 101130531 A | 2/2008 |

(Continued)

OTHER PUBLICATIONS

International Search Report and Written Opinion dated Mar. 6, 2019 in connection with International Application No. PCT/CN2018/117647, 12 pages.

(Continued)

*Primary Examiner* — Lessanework Seifu
(74) *Attorney, Agent, or Firm* — Baker & McKenzie LLP

(57) ABSTRACT

The present utility model provides a device for continuously producing sugar by hydrolyzation using a lignocellulosic raw material. The device comprises: an acid solution output unit, a raw material mixing unit, a feeding unit, a main reaction unit, and a discharging unit. The device is a genuine continuous hydrolyzation sugar-producing device, which can achieve continuous feeding, continuous reaction, and continuous discharging in terms of time, and can effectively (Continued)

reduce labor intensity, increase production efficiency, and increase sugar yields and sugar concentrations.

18 Claims, 2 Drawing Sheets

(51) Int. Cl.
*C13K 13/00* (2006.01)
*B01J 19/00* (2006.01)

(56) References Cited

FOREIGN PATENT DOCUMENTS

| | | |
|---|---|---|
| CN | 101130533 A | 2/2008 |
| CN | 207828156 U | 9/2018 |
| EP | 0037912 A2 | 10/1981 |
| WO | 2013041298 A1 | 3/2013 |

OTHER PUBLICATIONS

Extended European Search Report dated Jul. 16, 2021 in connection with European Application No. 007645807, 8 pages.

* cited by examiner

DEVICE FOR CONTINUOUSLY PRODUCING SUGAR BY HYDROLYZATION USING LIGNOCELLULOSIC RAW MATERIAL

CROSS-REFERENCE TO RELATED APPLICATIONS

This application is a continuation application of International Application No. PCT/CN2018/117647 filed Nov. 27, 2018, which claims priority to Chinese Application No. 201721686929.X filed Dec. 6, 2017, the contents of both which are hereby expressly incorporated by reference in their entirety, including the contents and teachings of any references contained therein.

TECHNICAL FIELD

The present utility model relates to a device for continuously producing sugar by hydrolyzation using lignocellulosic raw materials, which belongs to the technical field of hemicellulose and/or cellulose hydrolysis and sugar production.

BACKGROUND

Plant straw, cottonseed hulls, bagasse, and straws and hard outer shells of other plants are composed of hemicellulose, cellulose and lignin, wherein the hemicellulose and cellulose contain a large amount of polysaccharides and oligosaccharides or monosaccharides are obtained by hydrolyzing the above raw materials, and the reaction formula is as follows:

Hemicellulose hydrolysis: polypentoses→oligopentoses or pentose

Cellulose hydrolysis: polyhexoses→hexose

At present, domestically or internationally, the process of producing sugar from lignocellulosic raw materials is usually carried out by dilute acid hydrolysis. The corn cob is usually used as a raw material for sugar production. The first-generation acid hydrolysis reactor is a fixed bed reactor. The corncob is mixed with the acid solution in a certain ratio, and then sent to the reactor for cooking and hydrolysis. With a simple structure, the reactor has the disadvantage that the generated product cannot be separated timely, which thereby leads to further degradation. The second-generation acid hydrolysis reactor is a percolation reactor, which continuously sprays the acid solution into the corncob layer in the reactor during production, and the acid solution passes through the corncob layer and is fully contacted with the corncob for the hydrolysis reaction. Such a reactor has high hydrolysis efficiency and can effectively shorten the residence time of the sugar liquid in the reactor.

The first-generation and second-generation acid hydrolysis devices are both batch reactors, which have high labor intensity, low production efficiency, large area coverage and serious pollution. In addition, for existing reactor, due to the problems of acid solution only attaching to the surface of the materials, heterogeneous mixing of the material and the acid solution, and heterogeneous heating of water vapor, leading to the decomposition of the hydrolyzed sugar, more by-products, small yield of sugar, and low sugar concentration, the application of lignocellulosic raw materials in energy and chemical industries is negatively impacted.

Therefore, the study on a device for continuously producing sugar by hydrolyzation using a lignocellulosic raw material has a positive significance for solving the abovementioned technical problems in the prior art.

SUMMARY

The present utility model has been presented in view of the abovementioned problems. The utility model provides a device for continuously producing sugar by hydrolyzation using lignocellulosic raw materials, which at least solves the problems of large labor intensity and low production efficiency, sugar yield and sugar concentration, etc. caused by discontinuous reaction of the existing reactor, and can effectively improve labor productivity, reduce labor intensity, size of equipments and pollution, increase the sugar yield and sugar concentration, as well as utilize the heat of a circulating acid solution.

According to an aspect of the present utility model, provided is a device for continuously producing sugar by hydrolyzation using lignocellulosic raw material, the device comprising: an acid solution output unit for respectively outputting a first acid solution and a second acid solution; a raw material mixing unit connected to the acid solution output unit, for mixing the raw material with the first acid solution to form a mixture and continuously conveying the mixture; a feeding unit connected to the raw material mixing unit, for receiving the mixture, compressing the mixture and conveying the mixture outward; a main reaction unit connected to the feeding unit and the acid solution output unit, for receiving the mixture and the second acid solution respectively, and sufficiently stirring and mixing the mixture with the second acid solution under a pressure higher than a normal pressure to cause them to react; and a discharging unit connected to the main reaction unit, for performing solid-liquid separation of a resultant obtained from the reaction and outputting the product.

The continuous hydrolysis sugar-producing device is a continuous hydrolysis reaction device in a real sense, and achieves continuous feeding, continuous reaction, continuous discharging in terms of time, which reduces labor intensity and improves production efficiency. The device of the present utility model can not only hydrolyze hemicellulose, but also hydrolyze cellulose by adjusting the reaction conditions, for example, by increasing the reaction temperature, etc. The hydrolysis reaction occurs only in the main reaction unit, which reduces the formation of by-products, and the sugar obtained from the reaction can be discharged timely, thereby improving sugar yield and sugar concentration.

According to a preferred embodiment of the present utility model, the raw material mixing unit may comprise a screw mixer for uniformly mixing the raw material with the first acid solution with spiral agitation to form the mixture, and providing a continuous feed of the mixture to the feeding unit.

The lignocellulosic raw material needs to be hydrolyzed in an acidic environment. When the ratio of the acid solution to the solid raw material is not too large, the liquid cannot completely immerse the solid raw material, and the solid-liquid mixture needs to be uniformly mixed to avoid negatively impacting the hydrolysis effect. The use of the screw mixer allows the raw material to be uniformly mixed well with the acid solution to ensure a smooth subsequent hydrolysis reaction.

According to a preferred embodiment of the present utility model, the feeding unit may comprise a screw feeder with compression function for compressing the mixture and conveying the mixture to the main reaction unit.

According to a preferred embodiment of the present utility model, the screw feeder may comprise a compression section, of which the inner diameter and the screw pitch become smaller and smaller along a feeding direction.

According to a preferred embodiment of the present utility model, the screw feeder may further comprise a plug section being located after the compression section and with its inner diameter and screw pitch unchanged.

The hydrolysis reaction in the main reaction unit is carried out under a pressure higher than the normal pressure. The screw feeder of the feeding unit can ensure that the material in the main reaction unit will not go back into the feeding unit, and can maintain the pressure stable in the main reaction unit, thus ensure that the hydrolysis reaction in the main reaction unit is carried out under a stable pressure. In addition, by using the screw feeder, continuous and stable feeding can be provided without clogging.

According to a preferred embodiment of the present utility model, the feeding unit may further comprise a first tapered discharging tube connected to the raw material mixing unit and the screw feeder respectively, for receiving the mixture from the raw material mixing unit and conveying the mixture to the screw feeder.

In the feeding unit, the use of the first tapered discharging tube for receiving and transporting the mixture can ensure that the mixture enters the screw feeder smoothly, thereby avoiding clogging or poor delivery resulted from poor fluidity of the uniformly mixed mixture output from the raw material mixing unit.

According to a preferred embodiment of the present utility model, the main reaction unit may comprise a screw reactor, which is of a plug flow type and with no compression function.

The mixture undergoes the hydrolysis reaction in the screw reactor of the main reaction unit. When the screw reactor is set to be of a plug flow, the reaction is complete and the reaction efficiency can be improved, so that the solid-liquid mixing ratio of the mixture in the reactor is consistent in any reaction stage, and the efficiency of the hydrolysis reaction can be increased.

According to a preferred embodiment of the present utility model, the main reaction unit may further comprise a second tapered discharging tube connected to the feeding unit for receiving the mixture, and on top of the second tapered discharging tube is further provided an acid solution adding means connected to the acid solution output unit for adding the second acid solution.

In the main reaction unit, the use of the second tapered discharging tube for receiving and transporting the mixture can ensure that the mixture enters the screw reactor smoothly, thereby avoiding clogging or poor delivery resulted from poor fluidity of the solid-liquid mixture output from the feeding unit. The acid solution adding means arranged at the top of the second tapered discharging tube further supplements the acid solution as required for the reaction to achieve a set solid-liquid ratio, so that the hydrolysis reaction can be efficiently conducted.

According to a preferred embodiment of the present utility model, the acid solution adding means can add a second acid solution by spraying. The use of the spraying manner can more evenly spray the second acid solution to the mixture from the feeding unit and also facilitate uniformly mixing of the second acid solution and the mixture.

According to a preferred embodiment of the present utility model, the main reaction unit may further comprise a vapor inlet for receiving high-temperature vapor. The vapor input can maintain the reaction temperature of the main reaction unit in a suitable range, and avoid a decrease in the reaction rate caused by the temperature drop.

According to a preferred embodiment of the present utility model, the main reaction unit may further comprise a vent valve to discharge non-condensable gas generated during the reaction. In this way, it is ensured that the pressure in the main reaction unit is within a suitable range, thereby allowing the hydrolysis reaction to proceed stably.

According to a preferred embodiment of the present utility model, the discharging unit may comprise a screw discharger with a compression function for conducting extruding filtration and solid-liquid separation of the product.

According to a preferred embodiment of the present utility model, the screw discharger comprises a compression section, of which the inner diameter and the screw pitch become smaller and smaller along a discharging direction.

According to a preferred embodiment of the present utility model, the screw discharger further comprises a plug section being located after the compression section and with its inner diameter and screw pitch unchanged.

According to a preferred embodiment of the present utility model, provided is a screen mesh at the wall of the screw discharger, and the screw discharger discharges liquid through the screen mesh and has a solid discharging port at the end for discharging the solid.

The screw discharger of the discharging unit can ensure that the spraying would not happen during the process of outputting the product, and can maintain the pressure stable in the main reaction unit; in addition, it can provide continuous and stable discharge without clogging.

According to a preferred embodiment of the present utility model, the first acid solution may have a temperature of 40° C. to 95° C., and the second acid solution may have a temperature of 110° C. to 200° C.

Any acid concentration capable of achieving hydrolysis of lignocellulose is suitable for use in the present utility model. According to a preferred embodiment, the first acid solution and/or the second acid solution may have an acid concentration of 0.1% to 10% by weight.

According to a preferred embodiment of the present utility model, the temperature and pressure of the main reaction unit 40 can be adjusted and set by, for example, adjusting the temperature and pressure of the feeding, and controlling the vent valve, etc., and the main reaction unit can be set to have a temperature of 100° C. to 200° C. and a pressure of 0.1 MPa to 1.8 MPa, preferably the temperature of 100° C. to 160° C. and the pressure of 0.1 MPa to 0.8 MPa.

According to a preferred embodiment of the present utility model, the temperature and pressure within the raw material mixing unit 20 and the feeding unit 30 can be adjusted and set by, for example, adjusting the temperature and pressure of the feeding, and the raw material mixing unit can be set to have a temperature of 40° C. to 90° C. and a normal pressure; the feeding unit can be set to have a temperature of 40° C. to 90° C.

According to a preferred embodiment of the present utility model, the first acid solution and/or the second acid solution may be a circulating acid solution.

The above solutions of the present utility model realize continuous feeding, continuous reaction and continuous discharging in terms of time, which can effectively improve labor productivity, reduce labor intensity, size of equipments and pollution, and increase sugar yield and sugar concentration.

BRIEF DESCRIPTION OF THE DRAWINGS

The following drawings of the present utility model are hereby incorporated as part of the utility model for the understanding of the utility model. The embodiments and description of the utility model have been presented in the drawings in order to explain the principles of the utility model.

DETAILED DESCRIPTION

Specific embodiments of the present utility model will be described below.

Figure 1:
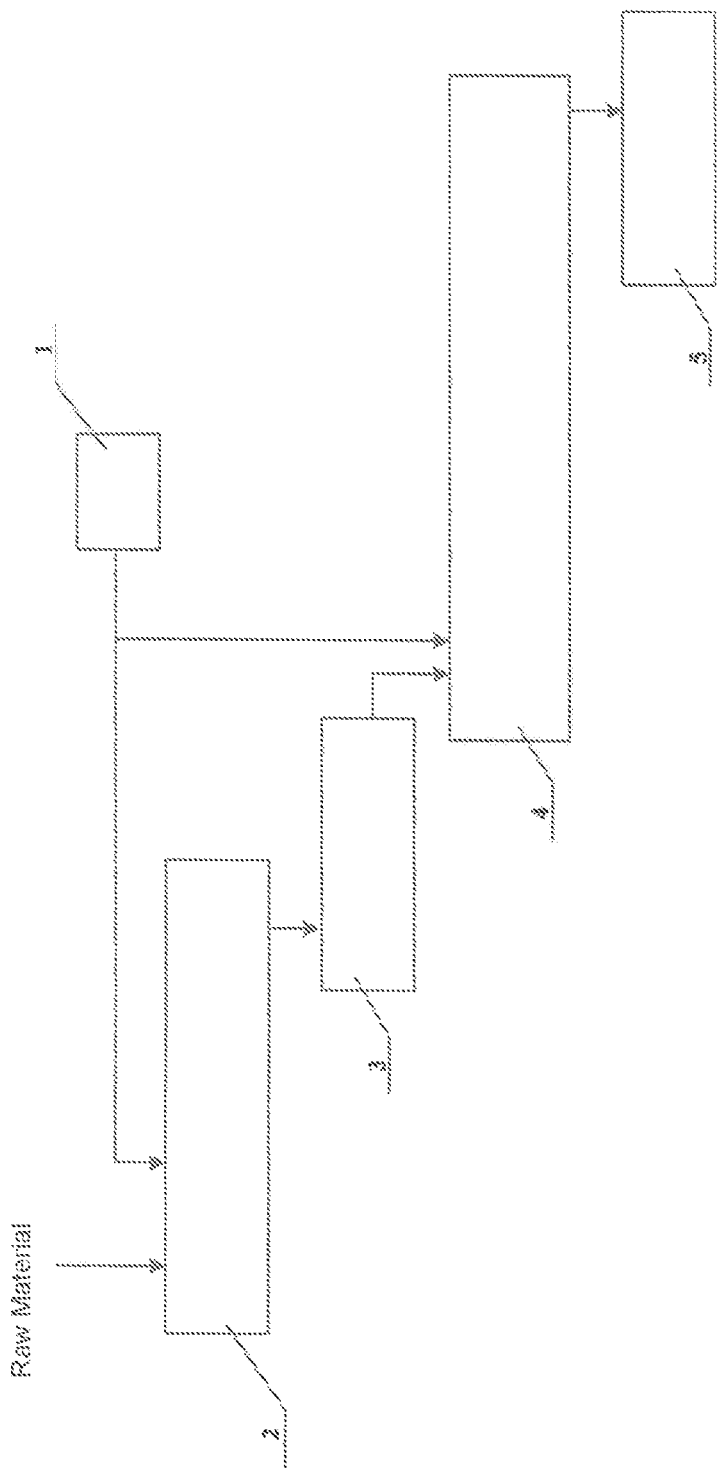
FIG. 1 is a schematic view of a device for continuously producing sugar by hydrolyzation using lignocellulosic raw materials according to an embodiment of the present utility model.

FIG. 1 schematically illustrates an embodiment in accordance with the present utility model.

As shown in FIG. 1, it is a device for continuously producing sugar by hydrolyzation using lignocellulosic raw materials, comprising an acid solution output unit 1, a raw material mixing unit 2, a feeding unit 3, a main reaction unit 4, and a discharging unit 5.

The device can continuously produce sugar by hydrolyzation with the following process.

The lignocellulosic raw material is uniformly mixed with the first acid solution output from the acid solution output unit 1 in a certain ratio to form a mixture in the raw material mixing unit 2. The mixture is continuously fed to a feeding unit 3 which compresses the mixture and delivers the mixture outward. The mixture continuously and stably enters the main reaction unit 4, and is mixed with the second acid solution output from the acid solution output unit 1 at a pressure higher than the normal pressure to reach a set solid-liquid ratio to cause them to react with each other. The resultant after completion of the reaction is continuously and stably conveyed to the discharging unit 5, and it is subject to solid-liquid separation in the discharging unit 5 to output a product. The continuous feed, the continuous reaction and the continuous discharging in terms of time which are achieved in the embodiment are the continuous sugar production by hydrolyzation in the real sense, which reduces the labor intensity and increases the production efficiency. The hydrolysis reaction only occurs in the main reaction unit 4, which reduces the production of by-products, and the sugar obtained from the reaction can be discharged timely, thereby improving the sugar yield and sugar concentration.

According to a preferred embodiment, the raw material mixing unit 2 may comprise a screw mixer for uniformly mixing the raw material and the first acid solution with spiral agitation to form a mixture and providing a continuous feeding to the feeding unit 3. The use of the screw mixer allows the raw material to be uniformly mixed well with the acid solution to ensure a smooth subsequent hydrolysis reaction.

According to a preferred embodiment, the feeding unit 3 may comprise a screw feeder with a compression function. Preferably, the screw feeder comprises a compression section, the inner diameter and the screw pitch of the compression section being smaller and smaller in the feeding direction, and more preferably the screw feeder comprises a plug section being located after the compression section and with the inner diameter and the screw pitch unchanged. The screw feeder is used to compress the mixture and deliver the mixture to the main reaction unit 4. The hydrolysis reaction in the main reaction unit 4 is carried out under a pressure higher than the normal pressure. The screw feeder of the feeding unit 3 can ensure that the material in the main reaction unit 4 will not go back into the feeding unit 3 and maintain the pressure stable in the main reaction unit 4, which ensures the hydrolysis reaction in the main reaction unit 4 to be carried out under a stable pressure. In addition, by using the screw feeder, continuous and stable feeding can also be provided without clogging.

According to a preferred embodiment, the feeding unit 3 may further comprise a first tapered discharging tube connected to the raw material mixing unit 2 and the screw feeder respectively for receiving the mixture from the raw material mixing unit 2 and conveying it to screw feeder. The use of the first tapered discharging tube for receiving and conveying the mixture in the feeding unit 3 can ensure that the mixture smoothly enters the screw feeder, thereby avoiding clogging or poor delivery resulted from poor fluidity of the uniform mixture outputted from the raw material mixing unit 2.

According to a preferred embodiment, the main body reaction unit 4 may comprise a screw reactor, which is of a plug flow type and with no compression function. The mixture undergoes the hydrolysis reaction in the screw reactor of the main reaction unit 4. When the screw reactor is set to be of a plug flow, the reaction can be complete and the reaction efficiency can be improved, so that the solid-liquid mixing ratio of the mixture in the reactor can be consistent in any reaction stage, and the efficiency of the hydrolysis reaction is improved.

According to a preferred embodiment, the main reaction unit 4 may further comprise a second tapered discharging tube connected to the feeding unit 3 for receiving the mixture. On top of the second tapered discharging tube is further provided an acid solution adding means connected to the acid solution output unit 1 for adding the second acid solution. The use of the second tapered discharging tube for receiving and conveying the mixture in the main reaction unit 4 can ensure that the mixture smoothly enters the screw reactor, which avoids clogging or poor delivery resulted from poor fluidity of the solid-liquid mixture output from the feeding unit 3. The acid solution adding means arranged at the top of the second tapered discharging tube further supplements the acid solution as required for the reaction to achieve a set solid-liquid ratio, so that the hydrolysis reaction can be efficiently conducted.

According to a preferred embodiment, the acid solution adding means can add a second acid solution by spraying. The use of the spraying manner can spray the second acid solution more uniformly to the mixture from the feeding unit 3 and also facilitate uniformly mixing of the second acid solution and the mixture.

According to a preferred embodiment, the main reaction unit 4 may further comprise a vapor input port for receiving high-temperature vapor. This vapor input can maintain the reaction temperature of the main reaction unit 4 in an appropriate range, and avoid a decrease in the reaction rate caused by the temperature drop.

According to a preferred embodiment, the main reaction unit 4 may further comprise a vent valve to discharge non-condensable gas generated during the reaction. In this way, it is possible to ensure that the pressure in the main reaction unit 4 is within a suitable range, thereby allowing the hydrolysis reaction to proceed stably.

According to a preferred embodiment, the temperature and pressure of the main reaction unit 4 can be adjusted and set by, for example, adjusting the temperature and pressure of the feeding, and controlling the vent valve, etc. The main reaction unit 4 can be set to have a temperature of 100° C. to 200° C. and a pressure of 0.1 MPa to 1.8 MPa, preferably a temperature of 100° C. to 160° C. and a pressure of 0.1 MPa to 0.8 MPa, more preferably a temperature of 115° C. to 125° C. and a pressure of 0.15 MPa to 0.25 MPa, and most preferably a temperature of 120° C. and a pressure of 0.2 MPa.

According to a preferred embodiment, the discharging unit 5 may comprise a screw discharger with a compression function for extruding filtration and solid-liquid separation of the product. Preferably, the screw discharger comprises a compression section, of which the inner diameter and the screw pitch become smaller and smaller along the discharging direction, and more preferably, the screw discharger further comprises a plug section being located after the compression section and with the inner diameter and the screw pitch unchanged. More preferably, there is a screen mesh at the wall of the screw discharger which discharges liquid through the screen mesh, and has a solid discharging port at the end for discharging solids. The screw discharger of the discharging unit 5 can ensure that the spraying will not happen during the process of outputting the resultant, maintain the pressure stable in the main reaction unit 4, and moreover provide continuous and stable discharging without clogging.

According to a preferred embodiment, the first acid solution has a temperature of preferably 40° C. to 95° C., more preferably 55° C. to 65° C., most preferably 60° C.; the second acid solution has a temperature of preferably 110° C. to 200° C., more preferably 125° C. to 135° C., most preferably 130° C. Any acid concentration capable of achieving hydrolysis of lignocellulose falls into the scope of the present utility model. According to a preferred embodiment, the first acid solution and/or the second acid solution may have an acid concentration of 0.1% to 10% by weight.

According to a preferred embodiment, the second acid solution added to the main reaction unit 4 is also capable of bringing the solid-liquid mixture to a set solid-liquid mass ratio, preferably a solid-liquid mass ratio of 1:3 to 1:8.

According to a preferred embodiment, the temperature and pressure in the raw material mixing unit 2 and the feeding unit 3 can be adjusted and set by, for example, adjusting the temperature and pressure of the feeding. The raw material mixing unit 2 can be set to have a temperature of 40° C. to 90° C. and a normal pressure; the feeding unit 3 can be set to have a temperature of 40° C. to 90° C.

According to a preferred embodiment, the first acid solution and/or the second acid solution may be a circulating acid solution. For example, if the acid is not neutralized in the subsequent sugar treatment process, the acid solution can be recycled for re-using.

Figure 2:
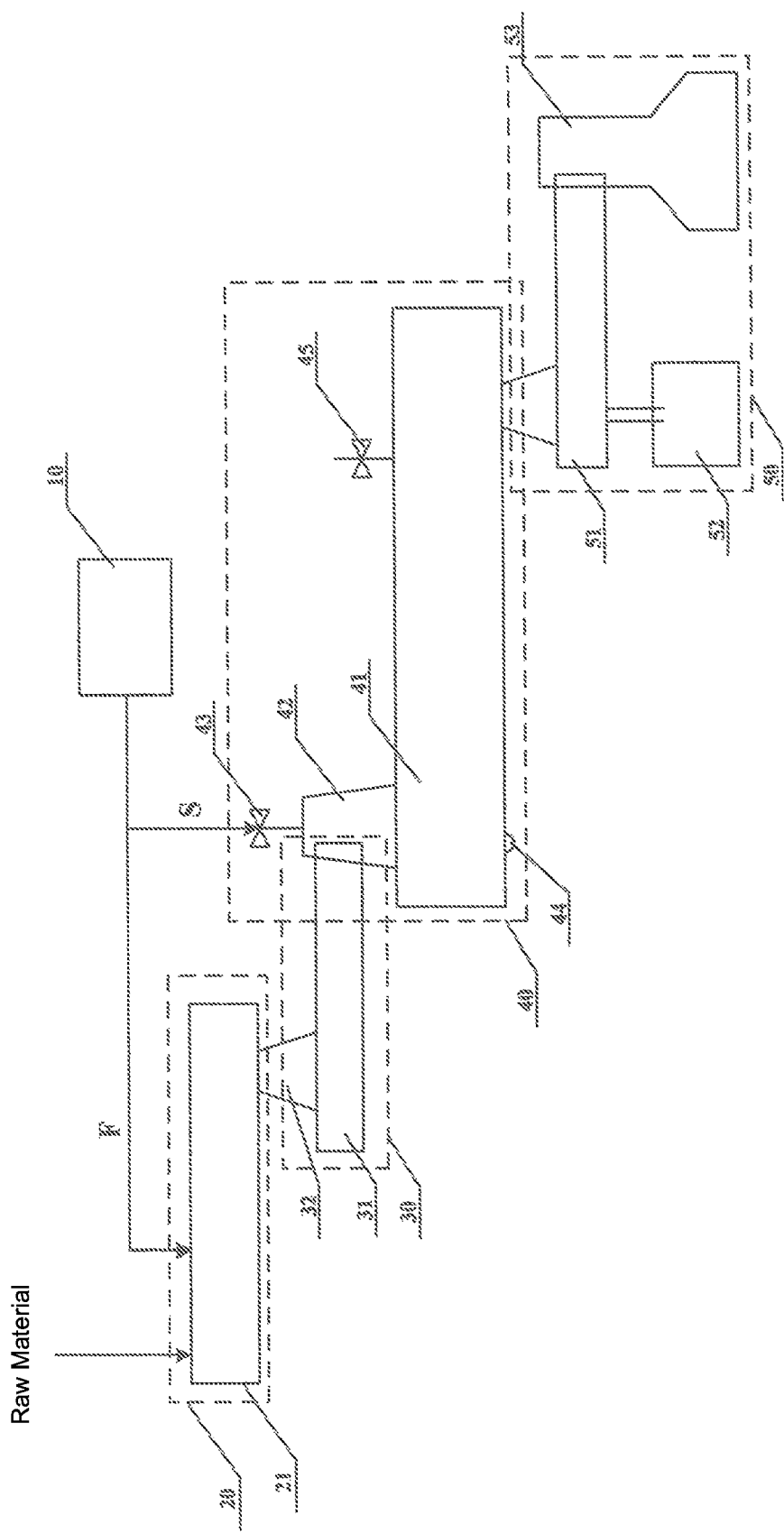
FIG. 2 is a schematic view of a device for continuously producing sugar by hydrolyzation using lignocellulosic raw materials according to another embodiment of the present utility model.

FIG. 2 shows a preferred embodiment of the present utility model, wherein, provided is a device for continuously producing sugar by hydrolyzation using a lignocellulosic raw material. It comprises an acid solution output unit 10, a raw material mixing unit 20, a screw mixer 21, a feeding unit 30, a screw feeder 31, a first tapered discharging tube 32, a main reaction unit 40, a screw reactor 41, a second tapered discharging tube 42, an acid solution adding means 43, a vapor input port 44, a vent valve 45, a discharging unit 50, a screw discharger 51, a sugar liquid collection tank 52, and a residue tank 53.

The device can continuously produce sugar by hydrolyzation with the following process.

The lignocellulosic raw material is continuously fed to the raw material mixing unit 20, wherein the raw material mixing unit 20 comprises a screw mixer 21 in which the raw material is uniformly mixed with the first acid solution from the acid solution output unit 10 (as shown by the arrow F) in a certain ratio to form a mixture, and the mixture is continuously outputted.

The uniformly mixed solid-liquid mixture enters the feeding unit 30, which includes the screw feeder 31 and the first tapered discharging tube 32. The mixture continuously enters the screw feeder 31 through the first tapered discharging tube 32. The screw feeder 31 has a compression function and includes a compression section and a plug section. The inner diameter and the screw pitch of the compression section become smaller and smaller along the feeding direction. The plug section is located after the compression section, and the inner diameter and the screw pitch remain unchanged. The screw feeder compresses the solid-liquid mixture and delivers it to the main reaction unit 40.

The main reaction unit 40 comprises a screw reactor 41, a second tapered discharging tube 42, an acid solution adding means 43, a vapor input port 44, and a vent valve 45. The mixture from the screw feeder 31 is fed into the second tapered discharging tube 42. The mixture continues to be mixed, in the second tapered discharging tube 42, with the second acid solution (as indicated by the arrow S) as added by the acid solution adding means 43 arranged at the top of the second tapered discharging tube 42 (preferably by spray addition) from the acid solution output unit 10, to reach the set solid-liquid ratio and then enters the screw reactor 41, and it is thoroughly stirred and mixed under a pressure higher than the normal pressure to carry out the reaction. The screw reactor 41 is preferably of a plug flow type and with no compression function. The second acid solution with high temperature can provide the heat as required for the reaction.

The vapor input port 44 can input vapor to the screw reactor 41 to compensate for heat loss. During the reaction, the vent valve 45 can be opened according to the pressure change in the screw reactor 41 to release the non-condensable gas and ensure the stable pressure of the system.

The resultant after completion of the reaction enters the discharging unit 50. The discharging unit 50 comprises a screw discharger 51 with a compression function, a sugar liquid collection tank 52, and a residue tank 53. The screw discharger 51 comprises a compression section and a plug section. The inner diameter and screw pitch of the compression section becomes smaller and smaller along the discharging direction. The plug section is located after the compression section, and the inner diameter and screw pitch remain unchanged. The resultant is subject to solid-liquid separation with the extrusion of the screw discharger 51. There is a screen mesh at the wall of the screw discharger which discharges the liquid through the screen mesh, and the liquid enters the sugar liquid collection tank 52. A solid discharging port at the end of the screw discharger is used for discharging solids, and the solids enter the residue tank 53.

According to a preferred embodiment, the temperature and pressure of the main reaction unit 40 can be adjusted and set by, for example, adjusting the temperature and pressure of the feeding, and controlling the vent valve, etc., and preferably, the main reaction unit 40 can be set to have a temperature of 100° C. to 180° C. and a pressure of 0.1 MPa to 1.8 MPa, more preferably a temperature of 115° C. to 125° C. and a pressure of 0.15 MPa to 0.25 MPa, most preferably a temperature of 120° C. and a pressure of 0.2 MPa.

According to a preferred embodiment, the temperature and pressure within the raw material mixing unit 20 and the feeding unit 30 can be adjusted and set by, for example, adjusting the temperature and pressure of the feeding. The raw material mixing unit 20 can be configured to have a temperature of 40° C. to 90° C. and a normal pressure, and the feeding unit 30 can be set to have a temperature of 40° C. to 90° C.

According to a preferred embodiment, the first acid solution has a temperature of preferably 50 to 70° C., more preferably 55° C. to 65° C., most preferably 60° C.; the second acid solution has a temperature of preferably 120° C. to 140° C., more preferably 125° C. to 135° C., most preferably 130° C.

According to a preferred embodiment, the first acid solution and/or the second acid solution may be a circulating acid solution. For example, if the acid is not neutralized in the subsequent sugar treatment process, the acid solution can be recycled for re-using.

The above solutions of the present utility model achieves continuous feeding, continuous reaction and continuous discharging in terms of time, which can effectively improve labor productivity, sugar yield and sugar concentration, and reduce labor intensity, size of equipments and pollution. Its production efficiency is 3 to 8 times that of existing devices. Taking the corncob as an example, the sugar yield is 33%, and the sugar concentration is 5% in the traditional process. The device of the present utility model can increase the sugar yield by 10% to 15% and the sugar concentration by more than 10%.

The present utility model has been described by the above embodiments, but it is to be understood that the foregoing embodiments are only for the purpose of illustration and description but are not intended to limit the utility model within the scope of the embodiments as described. In addition, those skilled in the art should understand that the present utility model is not limited to the above embodiments. Many variations and modifications can still be made according to the teachings of the present utility model. These variations and modifications fall within the scope of the present utility model as defined by the appended claims and their equivalents.

What is claimed is:

1. A device for continuously producing sugar by hydrolyzation using lignocellulosic raw material, comprising:
    an acid solution output unit for outputting a first acid solution and a second acid solution respectively;
    a raw material mixing unit connected to the acid solution output unit, for mixing the raw material with the first acid solution to form a mixture and continuously conveying the mixture;
    a feeding unit connected to the raw material mixing unit, for receiving the mixture, compressing the mixture and conveying the mixture outward; wherein the feeding unit comprises a first tapered discharging tube connected to the raw material mixing unit and a screw feeder respectively, for receiving the mixture from the raw material mixing unit and conveying the mixture to the screw feeder;
    a main reaction unit connected to the feeding unit and the acid solution output unit, for receiving the mixture and the second acid solution respectively, and sufficiently stirring and mixing the mixture with the second acid solution at a pressure higher than a normal pressure to cause them to react; and
    a discharging unit connected to the main reaction unit, for performing solid-liquid separation of a resultant obtained from the reaction and outputting a product.

2. The device according to claim 1, characterized in that the raw material mixing unit comprises a screw mixer for uniformly mixing the raw material with the first acid solution with spiral agitation to form the mixture, and providing a continuous feed of the mixture to the feeding unit.

3. The device according to claim 1 or 2, characterized in that the screw feeder has compression function for compressing the mixture and conveying the mixture to the main reaction unit.

4. The device according to claim 1, characterized in that the main reaction unit comprises a screw reactor which is of a plug flow type and with no compression function.

5. The device according to claim 1 or 4, characterized in that the main reaction unit comprises a second tapered discharging tube which is connected to the feeding unit and for receiving the mixture, and on top of the second tapered discharging tube is further provided with an acid solution adding means connected to the acid solution output unit, for adding the second acid solution.

6. The device according to claim 5, characterized in that the acid solution adding means adds the second acid solution by spraying.

7. The device according to claim 1, characterized in that the main reaction unit further comprises a vapor input port for receiving high-temperature vapor.

8. The device according to claim 1 or 7, characterized in that the main reaction unit further comprises a vent valve for discharging non-condensable gas generated during the reaction.

9. The device according to claim 8, characterized in that the main reaction unit can be set to have a temperature of 100° C. to 200° C. and a pressure of 0.1 MPa to 1.8 MPa.

10. The device according to claim 1, characterized in that the discharging unit comprises a screw discharger with compression function for performing extruding filtration and solid-liquid separation of the resultant.

11. The device according to claim 1, characterized in that the device is configured to output the first acid solution at a temperature between 40° C. to 95° C.; output the second acid solution at a temperature between 110° C. to 200° C.; and output the acid concentration of the first acid solution and the second acid solution to be between 0.1% to 10% by weight.

12. The device according to claim 1, characterized in that the main reaction unit can be set to have a temperature of 100° C. to 200° C. and a pressure of 0.1 MPa to 1.8 MPa.

13. The device according to claim 1, characterized in that the raw material mixing unit can be set to have a temperature of 40° C. to 90° C. and a normal pressure, and the feeding unit can be set to have a temperature of 40° C. to 90° C.

14. The device according to claim 3, characterized in that the screw feeder comprises a compression section, of which the inner diameter and the screw pitch become smaller and smaller along a feeding direction.

15. The device according to claim 14, characterized in that the screw feeder further comprises a plug section being located after the compression section and with its inner diameter and screw pitch unchanged.

16. The device according to claim 10, characterized in that the screw discharger comprises a compression section, of which the inner diameter and the screw pitch become smaller and smaller along a discharging direction.

17. The device according to claim 16, characterized in that the screw discharger further comprises a plug section being located after the compression section and with its inner diameter and screw pitch unchanged.

18. The device according to claim 10, characterized in that there is a screen mesh at the wall of the screw discharger which discharges liquid through the screen mesh and has a solid discharging port at the end for discharging solids.

* * * * *